United States Patent
Shibayama

(10) Patent No.: US 9,346,327 B2
(45) Date of Patent: May 24, 2016

(54) PNEUMATIC TIRE

(71) Applicant: TOYO TIRE & RUBBER CO., LTD., Osaka-shi, Osaka (JP)

(72) Inventor: Kensuke Shibayama, Osaka (JP)

(73) Assignee: TOYO TIRE & RUBBER CO., LTD., Osaka-shi, Osaka (JP)

(*) Notice: Subject to any disclaimer, the term of this patent is extended or adjusted under 35 U.S.C. 154(b) by 605 days.

(21) Appl. No.: 13/705,295

(22) Filed: Dec. 5, 2012

(65) Prior Publication Data

US 2013/0146196 A1 Jun. 13, 2013

(30) Foreign Application Priority Data

Dec. 7, 2011 (JP) ................................. 2011-268131

(51) Int. Cl.
*B60C 13/00* (2006.01)
*B60C 13/04* (2006.01)

(52) U.S. Cl.
CPC ............... *B60C 13/003* (2013.01); *B60C 13/04* (2013.01); *B60C 2013/045* (2013.04)

(58) Field of Classification Search
CPC ........ B60C 13/00; B60C 13/001; B60C 13/04
See application file for complete search history.

(56) References Cited

U.S. PATENT DOCUMENTS

2008/0053588 A1  3/2008  Tsuruta

FOREIGN PATENT DOCUMENTS

| JP | 04-275136 A | 9/1992 |
| JP | 2000-255223 A | 9/2000 |
| JP | 2008-056785 A | 3/2008 |

OTHER PUBLICATIONS

Decision of Refusal dated Dec. 15, 2015 issued in counterpart Japanese patent application No. 2011-268131, with English translation. (4 pages).

*Primary Examiner* — Justin Fischer
(74) *Attorney, Agent, or Firm* — Westerman, Hattori, Daniels & Adrian, LLP

(57) ABSTRACT

A pneumatic tire is disclosed. In one sidewall part, a sidewall rubber is formed by a black rubber over the whole circumference in a tire circumferential direction. In the other sidewall part, a different color rubber part for indicating marks on a tire outer surface is provided. The different color rubber part is divided into several sections in the circumferential direction, and the different color rubber part and the black rubber part are alternately and adjacently arranged in the circumferential direction. Side surfaces at both sides in the circumferential direction of the different color rubber part are formed into inclined surface shapes in a direction such that the side surfaces approach each other toward a tire inner surface side, thereby a size in the circumferential direction of the different color rubber part is decreased toward the tire inner surface side.

11 Claims, 8 Drawing Sheets

Figure 9

| | Comparative Example 1 | Comparative Example 2 | Example 1 | Example 2 | Example 3 | Example 4 |
|---|---|---|---|---|---|---|
| Cross-section in circumferential direction of white rubber part | Whole circumference | L1=L2<br>$\theta = \phi = 90°$ | L1>L2<br>$\theta = 30°$<br>$\phi = 45°$ | L1>L2<br>$\theta = \phi = 45°$ | L1>L2<br>$\theta = 30°$<br>$\phi = 45°$ | L1>L2<br>$\theta = \phi = 45°$ |
| Cross-section in meridian direction of white rubber part | H1<H2<br>$\alpha = \beta$<br>$= 130°$ | H1=H2<br>$\alpha = \beta = 90°$ | H1>H2<br>$\alpha = 30°$<br>$\beta = 15°$ | H1>H2<br>$\alpha = 15°$<br>$\beta = 30°$ | H1>H2<br>$\alpha = 15°$<br>$\beta = 30°$ | H1<H2<br>$\alpha = \beta$<br>$= 130°$ |
| General durability | 6300km | 4500km | 7800km | 7500km | 9000km | 7200km |
| Driving stability | 5 | 6 | 8 | 7 | 8 | 6 |

PNEUMATIC TIRE

CROSS-REFERENCE TO RELATED APPLICATIONS

This application is based upon and claims the benefit of priority from the prior Japanese Patent Application No. 2011-268131, filed on Dec. 7, 2011; the entire contents of which are incorporated herein by reference.

BACKGROUND

1. Technical Field

The disclosure relates to a pneumatic tire. More particularly, the disclosure relates to a pneumatic tire having a different color mark such as a white letter indicated on a sidewall part.

2. Related Art

Marks such as characters, signs and figures are indicated on a sidewall part of a tire. White letter in which, for example, a white character is embossed on an original black ground of a tire is sometimes used as the mark, and such a tire is called a white letter tire.

The white letter tire is generally produced as follows. A white rubber part for mark formation is provided on a sidewall rubber, followed by vulcanization molding in the state that the surface of the white rubber part is covered with a cover rubber layer comprising a black rubber. The part forming a mark is raised by a concave part of a mold during vulcanization molding. The surface of the raised part is shaved. White rubber is exposed by shaving the surface of the raised part, thereby a white letter that is an embossed mark comprising a while rubber is formed (see JP-A-4-275136 (1992)).

The white letter tire is that a white letter is indicated on one sidewall part provided outside when a tire is attached to vehicles, and consequently a white rubber part is provided. However, a white letter is not indicated on other sidewall part, and therefore, a white rubber part is not provided. In general, a white rubber reinforced by a non-carbon black filler has rigidity lower than that of a black rubber reinforced by carbon black. In spite of that, in the conventional white letter tire, a white rubber part is provided over the whole circumference in a tire circumferential direction in a sidewall part on which a white letter is indicated. As a result, due to the difference in rigidity between the white rubber and the black rubber, the difference in rigidity occurs between sidewall parts of both sides, and this may result in the decrease in driving stability.

JP-A-2000-255223 discloses that a white rubber part and a black rubber part are alternately and adjacently arranged in a tire circumferential direction on a sidewall part in order to provide a tire that appears to be colored when rotating. However, JP-A-2000-255223 does not disclose a shape of a boundary surface between the white rubber part and the black rubber part in a tire circumferential direction. If the boundary surface between the white rubber part and the black rubber part is a plane surface vertical to the tire circumferential direction, it is predicted that difference in strain in the boundary surface between the white rubber part and the black rubber part is increased during running, and there is a concern regarding separation in the boundary surface due to the difference in strain.

JP-A-2008-56785 discloses a technology of providing a temperature-sensitive color-changing part on a sidewall part of a tire. However, the temperature-sensitive color-changing part is formed into a circular pattern over the whole circumference in a tire circumferential direction. Thus, the disclosure of JP-A-2008-56785 does not suggest the present invention.

SUMMARY

A pneumatic tire according to an embodiment is a pneumatic tire comprising a pair of right and left bead parts, a pair of right and left sidewall parts, a tread part, and a carcass extending through the sidewall parts from the tread part and locked with the bead parts. In one sidewall part of the pair of right and left sidewall parts, a sidewall rubber is formed by a black rubber over the whole circumference in a tire circumferential direction. In the other sidewall part, a sidewall rubber provided outside the carcass comprises a black rubber part, and a different color rubber part comprising a rubber having a color other than black and for indicating marks on an outer surface of a tire, and the black rubber part and the different color rubber part are alternately and adjacently arranged in a tire circumferential direction. Side surfaces at both sides in the tire circumferential direction of the different color rubber part are formed into inclined surface shapes inclined in a direction such that the side surfaces approach each other toward a tire inner surface side, thereby the different color rubber part is formed such that a size in the tire circumferential direction of the different color rubber part is decreased toward the tire inner surface side.

BRIEF DESCRIPTION OF THE DRAWINGS

FIG. 9 shows Comparative Examples 1 and 2 and Examples 1-4.

DETAILED DESCRIPTION

Figure 1:
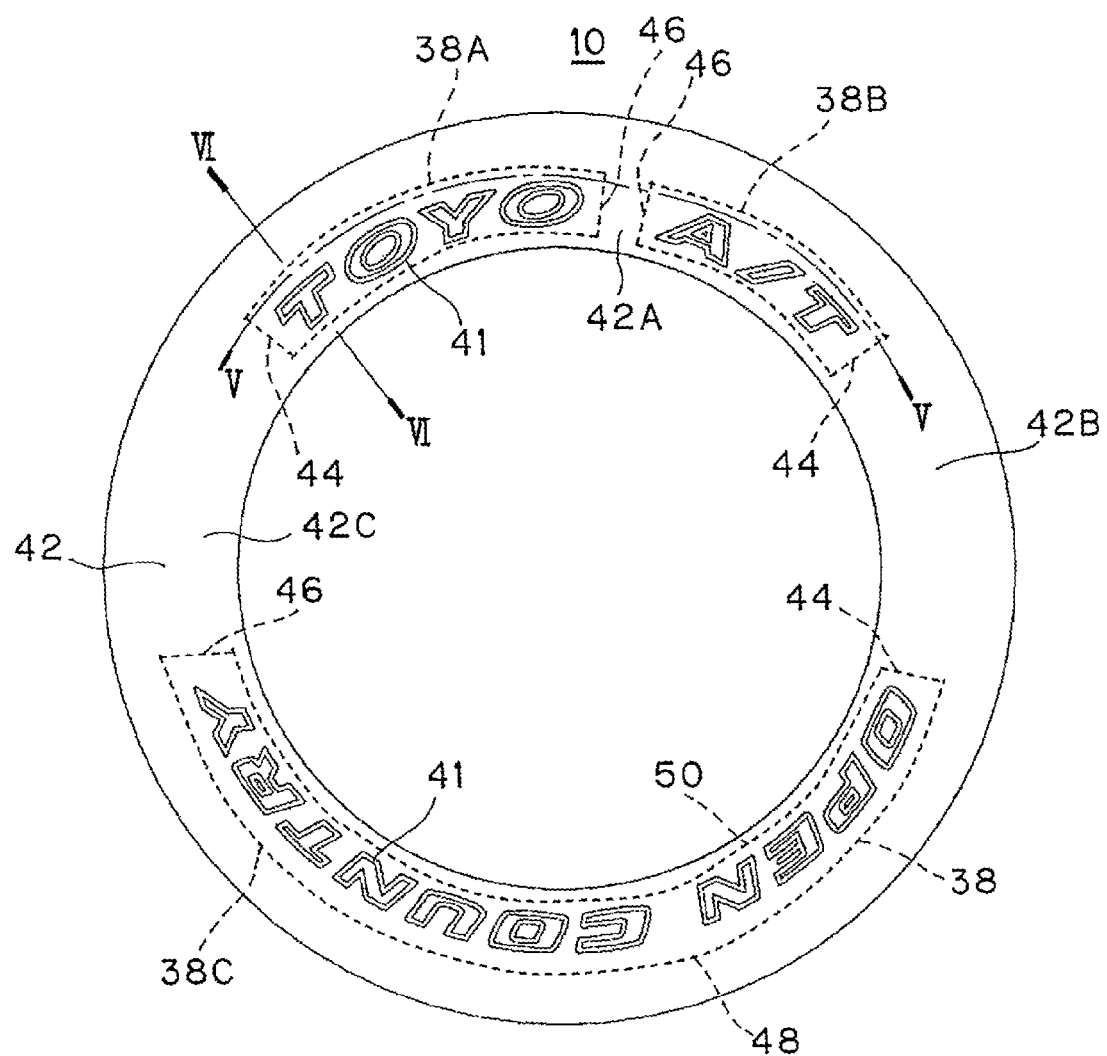
FIG. 1 is a side view of a pneumatic tire according to an embodiment.

In an embodiment of the pneumatic radial tire, a plurality of the different color rubber parts may include different color rubber parts in which right and left black rubber parts adjacent in the tire circumferential direction have different volumes, and the different color rubber part may be formed such that an inclination angle ($\theta$) to a tire outer surface of a side surface forming a boundary surface with the black rubber part having a small volume is smaller than an inclination angle ($\phi$) to the tire outer surface of a side surface forming a boundary surface with the black rubber part having a large volume.

In other preferred embodiment, end faces of both sides in a tire radial direction of the different color rubber part may be formed into inclined surface shapes inclined in a direction such that the end faces approach each other toward the tire inner surface side, thereby the different color rubber part may be formed such that a size in the tire radial direction of the different color rubber part is decreased toward the tire inner surface side. In this case, the different color rubber part may be formed such that an inclination angle ($\alpha$) to a tire outer surface of an end face inside in the tire radial direction is smaller than an inclination angle ($\beta$) to the tire outer surface of an end face outside in the tire radial direction. Furthermore, at least one of end faces of both sides in the tire radial direction of the different color rubber part may be formed in a curved line in a tire meridian cross-section. Those preferred embodiments can appropriately be combined.

According to the above embodiments, in the sidewall part having provided thereon the different color rubber part for indicating marks, the different color rubber part is divided into several sections in a tire circumferential direction, and each section is alternately provided together with a black rubber part having high rigidity. As a result, the difference in rigidity with the other sidewall part comprising a black rubber over the whole circumference can be decreased, thereby driving stability can be improved.

Side surfaces of both sides in a tire circumferential direction of the different color rubber part are formed into an inclined surface shape, and the different color rubber part formed such that a size in a tire circumferential direction thereof is decreased toward the tire inner surface side. As a result, the volume of the black rubber part is increased, and the driving stability is improved. Furthermore, difference in strain in a boundary surface between the different color rubber part and the black rubber part in a tire circumferential direction can be reduced, and durability can be improved.

One embodiment of the present invention is described below by reference to the drawings.

A pneumatic tire 10 according to the embodiment is a pneumatic radial tire comprising a pair of right and left bead parts 12 and 14, a pair of right and left sidewall parts 16 and 18 extending outwardly in a tire radial direction from the bead parts 12 and 14, and a tread part 20 connecting outer ends in a radial direction of the pair of right and left sidewall parts 16 and 18 and constituting a ground surface.

The pneumatic tire 10 further comprises a carcass 22 extending across a pair of bead parts 12 and 14. The carcass 22 extends from the tread part 20 through the right and left sidewall parts 16 and 18 and is locked by ring-shaped bead cores 24 and 24 embedded in the bead parts 12 and 14. The carcass 22 reinforces each of the parts 12, 14, 16, 18 and 20. In this example, both ends of the carcass 22 are locked by turning up from the inside to the outside around the bead core 24.

The carcass 22 comprises at least one carcass ply in which a carcass cord is arranged at an angle of from 70 to 90° to a tire circumferential direction, and is formed by two carcass plies in this example. An organic fiber cord such as rayon, aramide or polyester is preferably used as the carcass cord. The carcass 22 is arranged along a tire inner surface, and an inner liner layer 26 is provided as an air permeation-resistant rubber layer at the inner surface side of the carcass 22.

A belt 28 is arranged at the outside of the carcass 22 in the tread part 20. The belt 28 is provided between the carcass 22 and a tread rubber 30 in the tread part 20. The belt 28 comprises at least two belt plies in which a belt cord is arranged at an angle of from 10 to 35° to a tire circumferential direction. A steel cord or an organic fiber cord having high tension is used as the belt cord.

A reinforcing layer 32 comprising an organic fiber cord, called a cap ply or an edge ply, is provided on the outer periphery of the belt 28. The reinforcing layer 32 comprises cord arrangement having an angle of from 0 to 10° to a tire circumferential direction.

In the bead parts 12 and 14, a rim strip rubber 34 is provided on the outside of the turn-up part of the carcass 22, and constitutes a tire outer surface in the bead parts 12 and 14.

In the sidewall parts 16 and 18, a sidewall rubber 36 is provided on the outside of the carcass 22. The sidewall rubber 36 is joined, at its outer end in the radial direction, to an end in a width direction of the tread rubber 30, and is joined, at its inner end in the radial direction, to an outer end in the radial direction of a rim strip rubber 34.

Of the pair of right and left the sidewall parts 16 and 18, in the sidewall part 16 arranged inside when attaching a tire to vehicles, the sidewall rubber 36 is formed by a black rubber over the whole circumference in a tire circumferential direction. The black rubber comprises a rubber composition having carbon black compounded therewith as a reinforcing filler, and can use rubber formulation for general-purpose sidewall.

On the other hand, in the sidewall part 18 arranged outside when attaching a tire to vehicles, a different color rubber part 38 for indicating marks on a tire outer surface is provided on a part of the sidewall rubber 36. In the present embodiment, a white letter indicating characters such as business name, trademark and part number as marks by white color is used as shown in FIG. 1. Therefore, the different color rubber part 38 is a white rubber part (hereinafter referred to as a "white rubber part 38"), and the tire is called a white letter tire. The white rubber part 38 does not contain carbon black as a reinforcing filler, and comprises a rubber composition having compounded therewith a filler other than carbon black (that is, a non-carbon black filler), such as silica, talc or clay.

Figure 2:
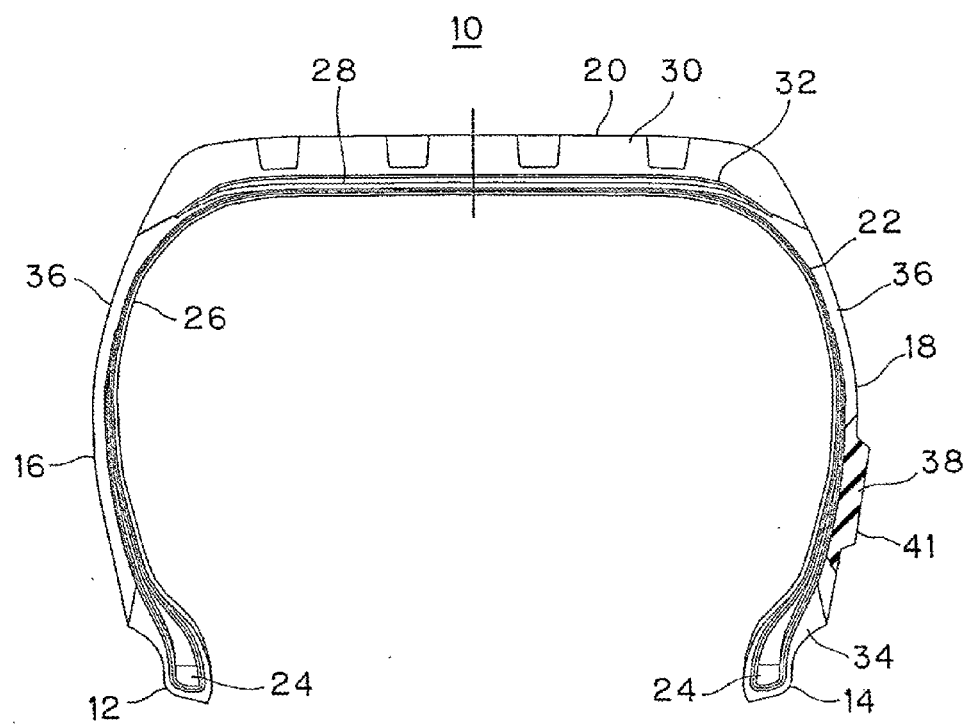
FIG. 2 is a cross-sectional view of the pneumatic tire.

As shown in FIG. 2, the white rubber part 38 constitutes a part of the sidewall rubber 36 in the tire radial direction of the sidewall part 18, and is provided at a position slightly downside than a maximum width position of a tire in this example. The white rubber part 38 constitutes a nearly whole rubber part in a thickness direction of the sidewall rubber 36 in the above part in the tire radial direction.

Figure 3:
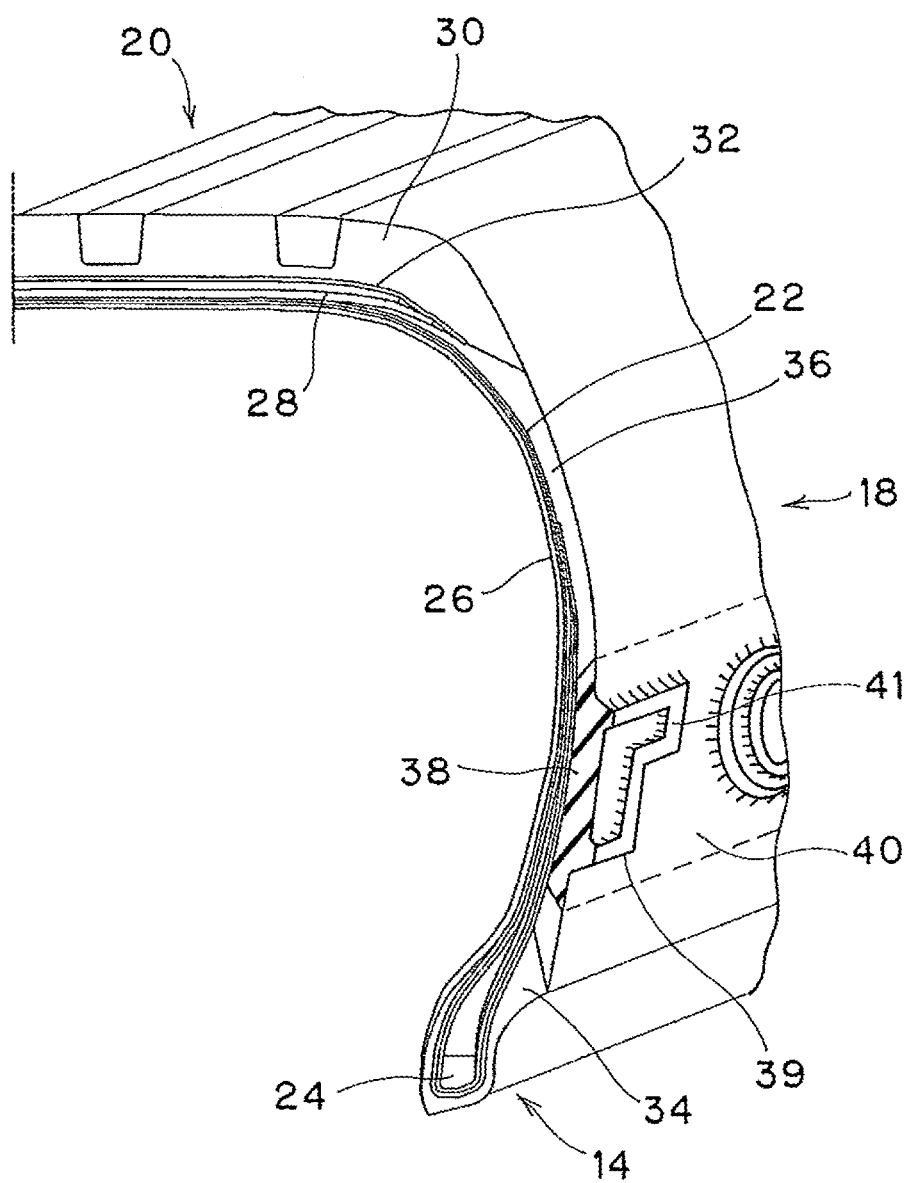
FIG. 3 is a perspective view of a cross-section of apart of the pneumatic tire.
Figure 4:
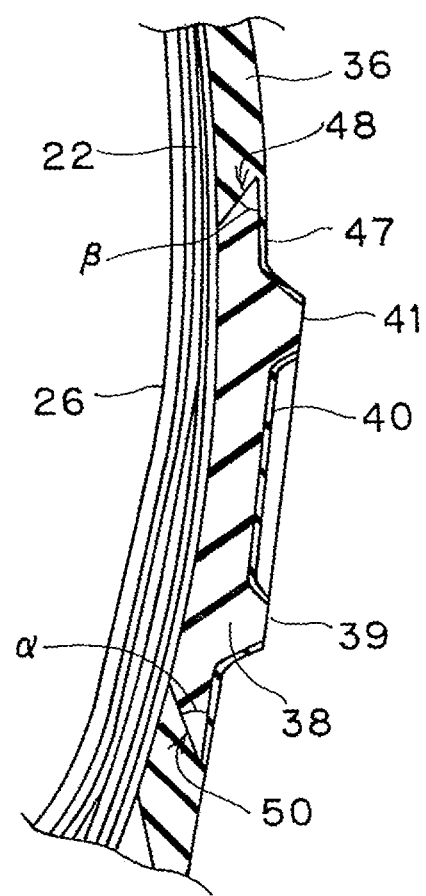
FIG. 4 is an enlarged cross-sectional view of a chief part of a sidewall part of the pneumatic tire.

As shown in FIGS. 3 and 4, the white rubber part 38 is covered with a cover rubber layer 40 comprising a black rubber at a surface of the tire outer surface side. In a raised part 39 raised corresponding to marks (characters), the white rubber part 38 is exposed by scraping off the cover rubber layer 40 on the surface thereof, thereby a white letter 41 that is an embossed mark comprising a white rubber is indicated. In this example, the mark 41 comprising "TOYO A/T OPEN COUNTRY" is formed by characters rimmed with white as shown in FIG. 1.

As shown in FIG. 1, the white rubber part 38 is divided into several sections in the tire circumferential direction. As a result, the white rubber part 38 and a black rubber part 42 are alternately and adjacently arranged in the tire circumferential direction. In this example, the white rubber part 38 is divided into three white rubber parts 38A, 38B and 38C in response to each character string of "TOYO", "A/T" and "OPEN COUNTRY". The part between the character strings constitutes the black rubber part 42, that is, a circumferential direction part on which a mark (character) is not formed is formed by the black rubber part 42. In this example, three black rubber parts 42A, 42B and 42C sandwiched by the above three white rubber parts 38A, 38B and 38C are provided.

The black rubber part 42 can be formed by a general-purpose rubber composition for sidewall, having compounded therewith carbon black as a reinforcing filler. In this example, the black rubber part 42 is formed by a black rubber integrated with the upper and lower sidewall rubbers 36, that is, the sidewall rubbers 36 at an outer side and an inner side in the radial direction.

Figure 5:
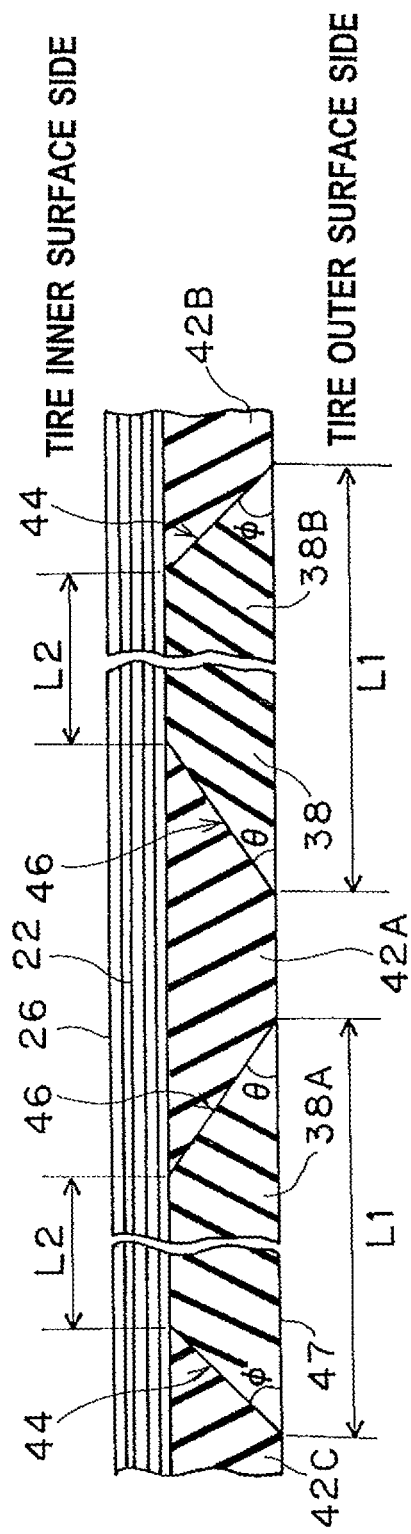
FIG. 5 is a cross-sectional view taken along V-V line in FIG. 1.

As shown in FIG. 5, side surfaces 44 and 46 at both sides in the tire circumferential direction of the white rubber part 38 are formed into inclined surface shapes inclined in a direction such that the side surfaces 44 and 46 approach each other toward a tire inner surface side. In other words, the both side surfaces 44 and 46 are inclined so as to approach each other in the tire circumferential direction toward an inner side in a thickness direction of the sidewall part 18. As a result, the size in the tire circumferential direction of the white rubber part 38 becomes small toward the tire inner surface side.

In detail, in a cross-sectional shape along the tire circumferential direction as shown in FIG. 5, the side surfaces 44 and 46 facing the tire circumferential direction of the white rubber part 38 are not vertical to a tire outer surface 47, and have an inclined surface shape in a direction approaching each other toward an inner surface side of a tire from an outer surface side thereof. Inclination angles θ and φ between the side surfaces 44 and 46 and the tire outer surface 47 (in detail, a surface at a tire outer surface side of the white rubber part 38, and a surface excluding the raised part 39) are preferably from 15° to 60°, more preferably from 15° to 45°, and still more preferably from 15° to 30°. Thus, by the inclination, the cross-sectional shape along the tire circumferential direction of the white rubber part 38 is a trapezoidal shape which broadens toward the tire outer surface side, and a size L1 in the circumferential direction on a surface at the tire outer surface side of the white rubber part 38 is set to be larger than a size L2 in the circumferential direction on a surface at the tire inner surface side thereof (L1>L2).

As shown in FIG. 1, in the white rubber part 38C indicating a string of characters of "OPEN COUNTRY" in the present embodiment, volumes of the black rubber parts 42B and 42C adjacent to the both sides thereof (in more detail, sizes in the circumferential direction at the tire outer surface side) are the same. On the other hand, in the white rubber parts 38A and 38B indicating a string of characters of "TOYO" and "A/T", volumes between the black rubber parts 42C and 42A and between the black rubber parts 42A and 42B adjacent to the both sides thereof differ. In the light of this, the inclination angles θ and φ of the side surfaces 44 and 46 of the white rubber parts 38A, 38B and 38C are set as follows.

Regarding the white rubber part 38C in which volumes of the black rubber parts 42B and 42C at both sides are the same, the inclination angles θ and φ of the side surfaces 44 and 46 at the both sides are set to be the same (θ=φ).

On the other hand, regarding the white rubber part 38A in which volumes of the black rubber parts 42C and 42A at both sides duffer, as shown in FIG. 5, the inclination angle θ to the tire outer surface 47 of the side surface 46 forming a boundary surface to the black rubber part 42A having a small volume is set to be smaller than the inclination angle φ to the tire outer surface 47 of the side surface 44 forming a boundary surface to the black rubber part 42C having a large volume (θ<φ). Similarly, regarding the white rubber part 38B, the inclination angle θ to the tire outer surface 47 of the side surface 46 forming a boundary surface to the black rubber part 42A having a small volume is set to be smaller than the inclination angle φ to the tire outer surface 47 of the side surface 44 forming a boundary surface to the black rubber part 42B having a large volume (θ<φ).

Figure 6:
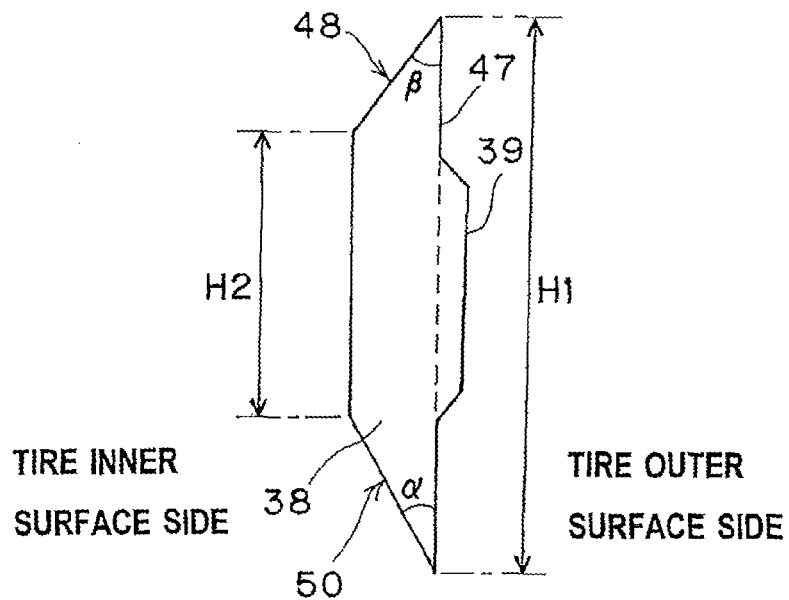
FIG. 6 is a cross-sectional view of a white rubber part at a position corresponding to VI-VI line in FIG. 1.

As shown in FIGS. 4 and 6, end faces 48 and 50 at both sides in the tire radial direction of the white rubber part 38 are formed into inclined surface shapes inclined in a direction such that the end faces 48 and 50 approach each other toward the tire inner surface side. That is, the both end faces 48 and 50 are inclined so as to approach each other in the tire radial direction toward an inner side in a thickness direction of the sidewall part 18. As a result, the size in the tire radial direction of the white rubber part 38 is decreased toward the tire inner surface side.

In detail, in a cross-section shape (tire meridian cross-section) along a tire radial direction as shown in FIG. 6, the upper and lower end faces 48 and 50 of the white rubber part 38 are not vertical to the tire outer surface 47, and are formed into an inclined surface shape inclined in a direction of approaching each other toward the tire inner surface side from the outer surface side. Inclination angles α and β that are angles between those upper and lower end faces 48 and 50 and the tire outer surface 47 (in detail, a surface at tire outer surface side of the white rubber part 38, and a surface excluding the raised part 39) are preferably from 15° to 60°, more preferably from 15° to 45°, and still more preferably from 15° to 30°. By the inclination, the cross-sectional shape along the tire radial direction of the white rubber part 38 is a trapezoidal shape which broadens toward the tire outer surface side, and a size H1 in the radial direction on a surface at the tire outer surface side of the white rubber part 38 is set to be larger than a size H2 in the radial direction on a surface at the tire inner surface side thereof (H1>H2).

Furthermore, as shown in FIG. 6, the white rubber part 38 has a shape that an inclination angle α to the tire outer surface 47 of the lower end face 50 forming a boundary surface to the sidewall rubber 36 at an inner side in the radial direction is set to be smaller than an inclination angle β to the tire outer surface 47 of the upper end face 48 forming a boundary surface to the sidewall rubber 36 at an outer side in the tire radial direction (α<β).

According to the pneumatic tire 10 of the embodiment comprising the above, in the sidewall part 18 on which a white letter has been indicated, the white rubber part 38 for indicating the white letter 41 is divided into a plurality of blocks every string of characters, and the block and the black rubber part 42 having high rigidity are alternately provided in the circumferential direction. Specifically, the white rubber part 38 is arranged only on a portion of the string of characters, and the black rubber part 42 having a high hardness is arranged on other portion in the circumferential direction. As a result, as compared with the conventional structure that a white rubber part has been provided over the whole circumference, difference in rigidity between the right and left sidewall parts 16 and 18 can be reduced, and the driving stability can be improved.

On the other hand, when the white rubber part 38 and the black rubber part 42 are alternately provided on the circumference of the sidewall part 18, a boundary surface between the white rubber part 38 and the black rubber part 42 is formed not only on the upper and lower end faces 48 and 50 of the white rubber part 38, but in the tire circumferential direction. As a result, in the boundary surface in the circumferential direction, the difference in strain is increased due to the difference in rigidity between the white rubber part and the black rubber part, and there is a concern of separation in the boundary surface. In particular, a white letter tire is mainly applied to tires used under high load, such as tires for RV (recreational vehicle), tires for SUV (sport-utility vehicle) and tires for LT (light track). Therefore, separation in the boundary surface becomes easy to cause, and durability may be impaired.

On the other hand, in the present embodiment, the side surfaces 44 and 46 at both sides in the tire circumferential direction of the white rubber part 38 are formed into an inclined surface shape, the inclination angles θ and φ are set to an acute angle shape of from 15° to 60°, and a size in a tire circumferential direction of the white rubber part 38 is set to be small toward the tire inner surface side (L1>L2). By this, lengths of the side faces 44 and 46 that are boundary surfaces to the white rubber part 38 and the black rubber part 42 in the tire circumferential direction become large. As a result, the difference in strain in the boundary surface can be reduced, and durability can be improved. Furthermore, by the inclination shape, the volume of the black rubber part 42 can be increased at the tire inner surface side, and as a result, the driving stability can be improved.

In the present embodiment, the volumes of the black rubber parts 42 at the right and left sides differ in the white rubber parts 38A and 38B indicating "TOYO" and "A/T" in FIG. 1. In the white rubber parts 38A and 38B, the inclination angle θ of the boundary surface 46 to the black rubber part 42A having a small volume is set to be smaller than the inclination angle φ of the boundary surface 44 to the black rubber parts 42C and 42B having a large volume (θ<φ). By this, in the black rubber part 42A having a small volume, the volume of the black rubber can be increased according to the decrease in inclination angle, and the durability can be improved, resulting in improvement in driving stability.

In the present embodiment, the upper and lower end faces 48 and 50 of the white rubber part 38 are formed into an inclined surface shape, the inclination angles α and β are set to an acute angle shape of from 15° to 60°, and a size in the tire radial direction of the white rubber part 38 is set to be small toward the tire inner surface side (H1>H2). By this, the volume of the black rubber can be increased at the upper and lower sides of the white rubber part 38, and the driving stability can be improved. Furthermore, the lengths of the end faces 48 and 50 that are boundary surfaces between the white rubber part 38 and the upper and lower black rubbers become large. As a result, the difference in strain in the boundaries is reduced, thereby durability can be improved.

In the present embodiment, the inclination angle α at the lower end face 50 of the white rubber part 38 is set to be smaller than the inclination angle β at the upper end face 48 thereof (α<β). In general, the white rubber part 38 easily causes separation of the lower end face 50 in the boundary surface near the bead part 14 than the upper end face 48. Therefore, by setting the inclination angle α at the lower end face 50 to be small, the difference in strain in the boundary surface with the black rubber can be decreased, and durability can be improved.

Figure 7:
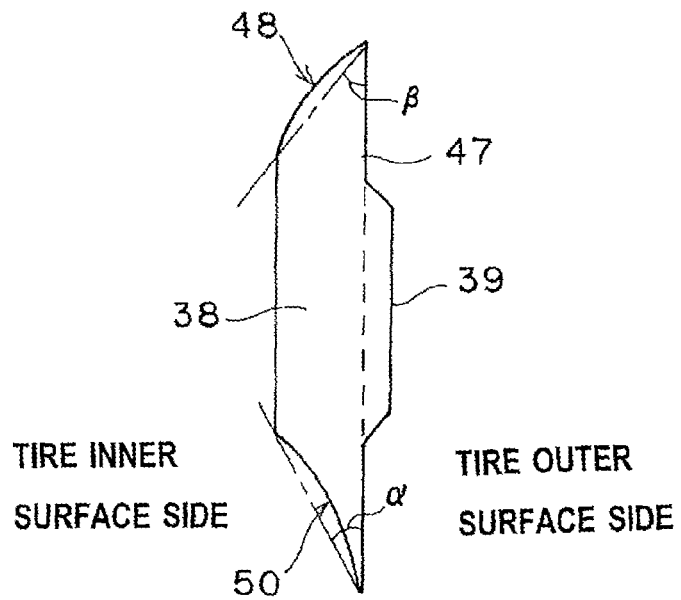
FIG. 7 is a cross-sectional view of a white rubber part according to a modification example.
Figure 8:
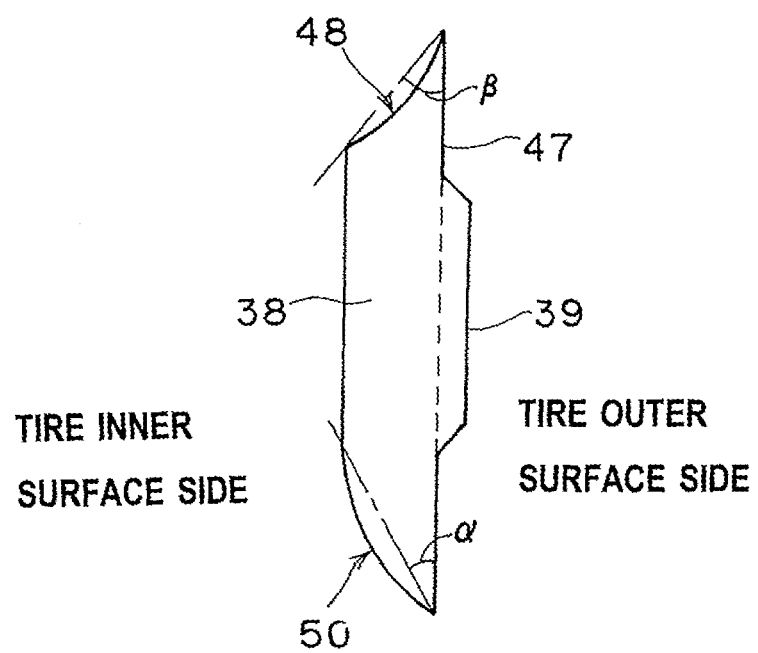
FIG. 8 is a cross-sectional view of a white rubber part according to other modification example.

FIG. 7 and FIG. 8 are cross-sectional views of the white rubber part 38 according to the modification example, and show cross-sectional shapes at a position corresponding to VI-VI line in FIG. 1, similar to FIG. 6.

In the example shown in FIG. 7, the upper end face 48 of the white rubber part 38 is formed into a curved line shape expanding outwardly in the radial direction in the tire meridian cross-section. Therefore, the upper end face 48 is formed into a convex-curved surface. Furthermore, the lower end face 50 of the white rubber part 38 is formed into a curved line shape depressed outwardly in the radial direction in the tire meridian cross-section. Therefore, the lower end face 50 is formed into a concave-curved surface.

In the example shown in FIG. 8, contrary to the example shown in FIG. 7, the upper end face 48 of the white rubber part 38 is formed into a curved line shape depressed inwardly in the radial direction in the tire meridian cross-section, and the lower end face 50 is formed into a curved line shape expanded inwardly in the radial direction.

Thus, by forming the boundary surface with the black rubber in a curved surface shape in the upper and lower end faces 48 and 50 of the white rubber part 38, the length of the boundary surface becomes large, and strain in the boundary surface can be dispersed. This leads to further improvement in durability.

In the case that the end faces 48 and 50 are formed into a curved surface shape, the inclination angles α and β can be defined by an angle formed between a line connecting the ends of a tire outer surface side and a tire inner surface side, and the tire outer surface 47, as shown in FIG. 7 and FIG. 8.

Both side surfaces 44 and 46 in the circumferential direction of the white rubber part 38 may similarly be formed into a curved surface shape. That is, at least one of the both side surfaces 44 and 46 may be formed into a curved line shape in a cross-section along the tire circumferential direction. In this case, the inclination angles θ and φ can be defined by an angle formed between a line connecting the ends at a tire outer surface side and a tire inner surface side, and the tire outer surface 47.

The above embodiment describes the case of a white letter tire. However, the mark indicated on a tire surface is not limited to characters, and the present invention can be applied to tires indicating various marks such as signs and figures. Furthermore, a color of a mark is not limited to white, and various colors can be employed so long as it is a color other than black.

The present invention has been described in detail above by particularly preferred embodiment, but the present invention is not limited to the embodiment shown in the drawings, and various modifications can be made without departing the gist of the present invention.

EXAMPLES

A pneumatic radial tire of the embodiment shown in FIGS. 1 to 6 was manufactured by way of trial in the manners that a tire size is P256/70R17 and constitution of the white rubber part 38 is as shown in FIG. 9 below (Example 3). In detail, regarding the white rubber parts 38A and 38B, the inclination angles θ and φ of the side surfaces 44 and 46 at both sides in the circumferential direction were as shown in FIG. 9, and regarding the white rubber part 38C, the inclination angles of the side surfaces 44 and 46 at both sides in the circumferential direction were θ=φ=45°.

Comparative Example 1 corresponds to the conventional tire, and a tire was prepared in the same manner as in Example except that a white rubber part having a meridian cross-sectional shape of FIG. 9 was formed on the whole circumference in a circumferential direction. In Comparative Example 2, a tire was prepared in the same manner as in Example 3 except that a white rubber part and a black rubber part were alternately and adjacently arranged in a circumferential direction, but the boundary surfaces of those were all vertical to the tire outer surface (θ=φ=90°), and furthermore, regarding a meridian cross-sectional shape of the white rubber part, the upper and lower end faces are vertical to the tire outer surface) (θ=φ=90°).

In Example 2, a tire was prepared in the same manner as in Example 3 except that regarding all of the white rubber parts 38A to 38C, the inclination angles of the side surfaces 44 and 46 at both ends in the circumferential direction were θ=φ=45°. In Example 1, a tire was prepared in the same manner as in Example 3 except that the meridian cross-sectional shape of the white rubber part 38 was that the inclination angle α of the lower end face 50 was larger than the inclination angle β of the upper end face 48 as shown in FIG. 9 (α>β). In Example 4, a tire was prepared in the same manner as in Example 2 except that the meridian cross-sectional shape of the white rubber part 38 was the same cross-sectional shape as that in Comparative Example 1.

Each pneumatic radial tire was subjected to a general durability test, and driving stability was evaluated. Each evaluation method is as follows.

General durability test: Each tire is fixed to a rim specified in TRA (The Tire and Rim Association), and maximum air pressure is charged therein. Each tire is run at a constant speed of 80 km/h under a load of 85% of the maximum load for 4 hours using a drum tester (drum diameter: 1,700 mm) (ambient temperature is 38±3° C.). The tire is then run under a load of 90% of the maximum load for 6 hours, and further run under a load of 100% of the maximum load for 24 hours. Thereafter, appearance and an inner surface are checked, and if there is nothing wrong, the tire is further run under a load of 120% of the maximum load for 24 hours. If there is nothing wrong in the appearance and inner surface, the tire is further run under a load of 140% of the maximum load until failure occurs. Running distance until occurrence of failure is shown in FIG. 9.

Driving stability: Each tire was fixed to a rim specified in TRA, an inner pressure was set to 250 kPa, and the rim with the tire was fixed to a test vehicle with 4500 cc displacement. The vehicle was run on a test course by three trained test drivers, and feeling was evaluated. Scoring was conducted based on a scale of 1 to 10, making comparison with the tire of Comparative Example 1 which was scored 5. The scoring means that driving stability is excellent with increasing the numeral.

The results are shown in FIG. 9. As compared with Comparative Example 1, Comparative Example 2 in which a white rubber part is divided into several sections in a circumferential direction and the white rubber part and a black rubber part are alternately arranged was such that driving stability was improved, but durability was poor.

On the other hand, in Examples 1 to 4, the white rubber part and the black rubber part are alternately and adjacently arranged in a circumferential direction, side surfaces at both sides in a circumferential direction of the white rubber part are formed into an inclined surface shape, and a size in a tire circumferential direction of the white rubber part is set to be decreased toward the tire inner surface side (L1>L2). Therefore, the driving stability was improved in the tires of Examples 1 to 4 without impairing durability.

Particularly, in Examples 1 to 3, regarding the meridian cross-sectional shape of the white rubber part, the upper and lower end faces are formed into an inclined surface shape, and a size in a tire radial direction of the white rubber part is set to be decreased toward the tire inner surface side (H1>H2). Therefore, the durability and driving stability are further excellent. Furthermore, in Example 3, in the white rubber part in which volumes of the black rubber parts at the right and left sides differ, the inclination angle θ of the boundary surface with the black rubber part having a small volume is set to be smaller than the inclination angle φ of the boundary surface with the black rubber part having a large volume (θ<φ), and the inclination angle α at the lower end face is set to be smaller than the inclination angle β at the upper end face of the white rubber part (α<β). As a result, the durability and driving stability were further excellent.

The tire according to the embodiment can suitably be used as tires for use under high load, such as tires for RV (recreational vehicle), tires for SUV (sport-utility vehicle) and tires for LT (light track). However, the tire of the embodiment is not limited to those tires, and can be used as pneumatic tires for various passenger cars, tracks and buses.

What is claimed is:

1. A pneumatic tire comprising:
a pair of right and left bead parts,
a pair of right and left sidewall parts,
a tread part, and
a carcass extending through the sidewall parts from the tread part and locked with the right and left bead parts,
wherein, in one sidewall part of the pair of right and left sidewall parts, a sidewall rubber is formed by a black rubber over the whole circumference in a tire circumferential direction,
in the other sidewall part, a sidewall rubber provided outside the carcass comprises at least one black rubber part and at least one different color rubber part comprising a rubber having a color other than black and which indicate marks on an outer surface of the tire,
the at least one black rubber part and the at least one different color rubber part are alternately and adjacently arranged in a tire circumferential direction, and
side surfaces at both sides in the tire circumferential direction of the at least one different color rubber part are formed into inclined surface shapes inclined in a direction such that the side surfaces approach each other toward a tire inner surface side, thereby the at least one different color rubber part is formed such that a size in the tire circumferential direction of the at least one different color rubber part is decreased toward the tire inner surface side.

2. The pneumatic tire according to claim 1, comprising a plurality of the at least one different color rubber parts, including different color rubber parts in which right and left black rubber parts adjacent in the tire circumferential direction have different volumes, and the plurality of the at least one different color rubber parts are formed such that an inclination angle (θ) to a tire outer surface of a side surface forming a boundary surface with the black rubber part having a small volume is smaller than an inclination angle (φ) to the tire outer surface of a side surface forming a boundary surface with the black rubber part having a large volume.

3. The pneumatic tire according to claim 1, wherein end faces of both sides in a tire radial direction of the at least one different color rubber part are formed into inclined surface shapes inclined in a direction such that the end faces approach each other toward the tire inner surface side, thereby the at least one different color rubber part is formed such that a size in the tire radial direction of the different color rubber part is decreased toward the tire inner surface side.

4. The pneumatic tire according to claim 2, wherein end faces of both sides in a tire radial direction of the plurality of different color rubber parts are formed into inclined surface shapes inclined in a direction such that the end faces approach each other toward the tire inner surface side, thereby the plurality of different color rubber parts are formed such that sizes in the tire radial direction of the plurality of different color rubber parts are decreased toward the tire inner surface side.

5. The pneumatic tire according to claim 3, wherein the at least one different color rubber part is formed such that an inclination angle (α) to a tire outer surface of an end face inside in the tire radial direction is smaller than an inclination angle (β) to the tire outer surface of an end face outside in the tire radial direction.

6. The pneumatic tire according to claim 4, wherein the plurality of color rubber parts are formed such that an inclination angle (α) to a tire outer surface of an end face inside in the tire radial direction is smaller than an inclination angle (β) to the tire outer surface of an end face outside in the tire radial direction.

7. The pneumatic tire according to claim 3, wherein at least one of the end faces of both sides in the tire radial direction of the at least one different color rubber part is formed in a curved line in a tire meridian cross-section.

8. The pneumatic tire according to claim 1, wherein the at least one different color rubber part has inclination angles (φ) and (θ) to a tire outer surface of the side surfaces at both sides in the tire circumferential direction of from 15° to 60°.

9. The pneumatic tire according to claim 1, wherein the at least one different color rubber part has inclination angles (α) and (β) to a tire outer surface of end faces at both sides in a tire radial direction of from 15° to 60°.

10. The pneumatic tire according to claim 1, wherein the at least one different color rubber part is a white rubber part.

11. The pneumatic tire according to claim 2, wherein the plurality of different color rubber parts are white rubber parts.

\* \* \* \* \*